United States Patent [19]
Kendrick

[11] Patent Number: 6,039,357
[45] Date of Patent: Mar. 21, 2000

[54] SECURITY BANDS TO PREVENT COUNTERFEITING WITH COLOR COPIES

[75] Inventor: Jimmy Ray Kendrick, Nacogdoches, Tex.

[73] Assignee: Moore North America, Inc., Grand Island, N.Y.

[*] Notice: This patent is subject to a terminal disclaimer.

[21] Appl. No.: 07/817,894

[22] Filed: Jan. 8, 1992

[51] Int. Cl.$^7$ .................................................. B42D 15/00
[52] U.S. Cl. .............................. 283/93; 283/94; 283/95; 283/902
[58] Field of Search ................................ 283/94, 95, 93, 283/902

[56] References Cited

U.S. PATENT DOCUMENTS

| | | | |
|---|---|---|---|
| 4,168,088 | 9/1979 | Somlyody | 283/8 R |
| 4,210,346 | 7/1980 | Mowry, Jr. et al. | 283/93 |
| 4,265,469 | 5/1981 | Mowry, Jr. et al. | 283/8 B |
| 4,341,404 | 7/1982 | Mowry, Jr. et al. | 283/8 B |
| 4,351,547 | 9/1982 | Brooks, II | 283/8 R |
| 4,420,175 | 12/1983 | Mowry, Jr. | 283/93 |
| 4,579,370 | 4/1986 | Corwin et al. | 283/72 |
| 4,582,346 | 4/1986 | Caprio et al. | 283/94 |
| 4,632,430 | 12/1986 | Wicker | 283/91 |
| 4,684,593 | 8/1987 | Wicker | 430/6 |
| 4,790,566 | 12/1988 | Boissier et al. | 283/91 |
| 5,018,767 | 5/1991 | Wicker | 283/67 |
| 5,074,596 | 12/1991 | Castagnoli | 283/91 |
| 5,149,140 | 9/1992 | Mowry, Jr. et al. | 283/93 |
| 5,197,765 | 3/1993 | Mowry, Jr. et al. | 283/93 |
| 5,340,159 | 8/1994 | Mowry, Jr. . | |
| B1 4,175,774 | 4/1987 | Tonges et al. | 283/94 |

FOREIGN PATENT DOCUMENTS

| | | |
|---|---|---|
| 2138097 | 7/1995 | Canada . |
| 0409608 A2 | 1/1991 | European Pat. Off. . |
| 522827 | 1/1993 | European Pat. Off. . |
| 2217258 | 10/1989 | United Kingdom ..................... 283/93 |

OTHER PUBLICATIONS

Morgenstein Memo with Attachments Circa 1977, Copy in 283/093.

*Primary Examiner*—Frances Han
*Attorney, Agent, or Firm*—Nixon & Vanderhye P.C.

[57] ABSTRACT

A protected/security document is provided that foils counterfeiting even if a laser photocopy machine (such as a Canon 500 color copier) is utilized. The document has at least three discrete half-tone printed bands disposed on its surface, provided by dots or lines. Each printed band has a different screen density and within each bands the dots or lines comprise a warning word or symbol (e.g. "Void"), or a background. The dots or lines of either the "Void" or background drop out when photocopied, while the dots or lines of the other do not. The dots or lines that do not drop out may be dimensioned so that there are about 24–34 per centimeter, while for those that do drop out there are about 52–64 per centimeter. The bands are typically arranged either linearly or in concentric circles, and interband areas having density gradually transitioning between the densities of adjacent bands are provided. The total density variation between discrete bands is typically about 10–35%, depending upon ink color, typically about 1.0–10% gradation between adjacent bands. Full tone indicia, which does readily reproduce, is also printed on the substrate.

12 Claims, 3 Drawing Sheets

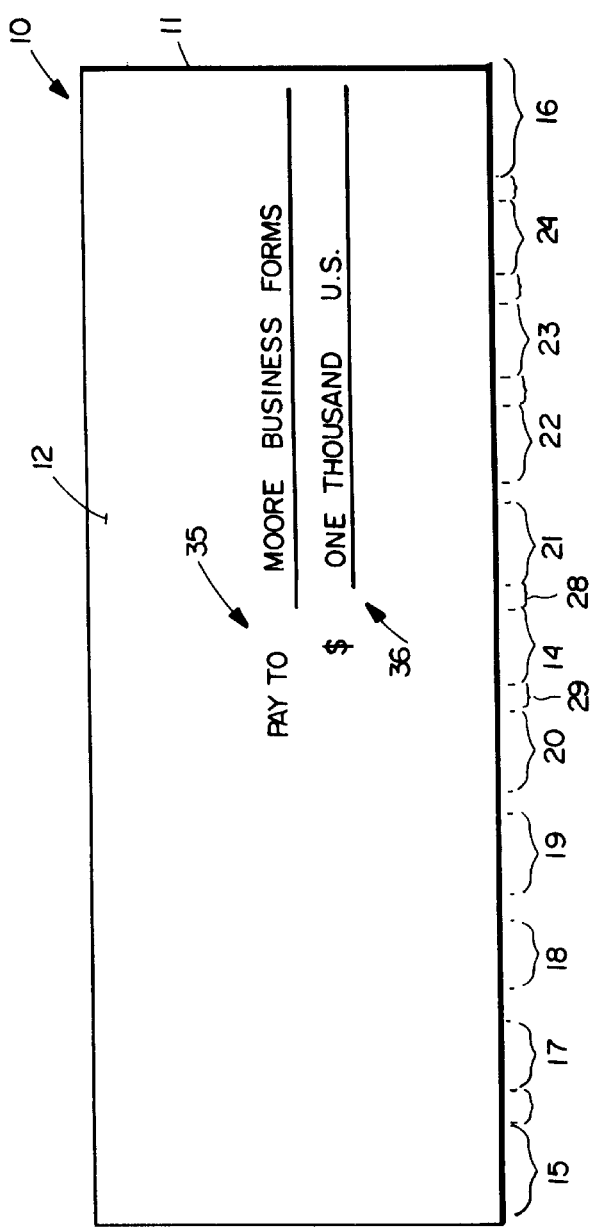
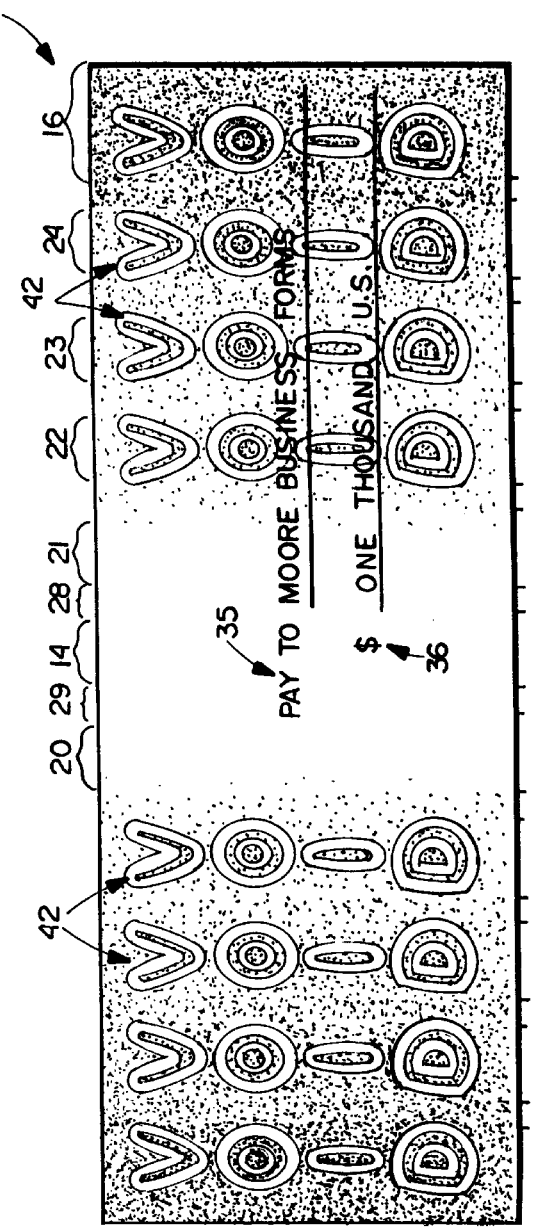

SECURITY BANDS TO PREVENT COUNTERFEITING WITH COLOR COPIES

BACKGROUND AND SUMMARY OF THE INVENTION

For many years there have been products on the market which have guarded against nefarious reproduction of checks, motor vehicle titles, and like documents which the owner wishes to retain secure. For example products sold by Moore Business Forms, Inc. of Lake Forest, Illinois under the trademarks "HIDDEN WORD", and "MOOREGUARD®", and products such as shown in U.S. Pat. Nos. 4,582,346, 4,265,469, and 4,175,774 have been provided which are reasonably effective in preventing counterfeiting utilizing xerographic photocopiers, even many color copies such as the Xerox L-6500. However, photocopy machine technology has increased substantially, and now there are many copiers out on the market that have higher resolution than in the past, and provide copies utilizing processes other than the xerographic process, such as by laser copying. One such photocopy machine is a Canon 500 color copier, which has high resolution and which uses laser technology rather than xerographic technology. Prior art protected documents (also known as security documents) are not effective in preventing nefarious reproduction of documents utilizing copiers such as the Canon 500 color copier if the operator is able to change copier settings. Utilizing such equipment, a setting can almost always be found which allows accurate counterfeiting of ostensibly protected documents.

According to the present invention, a protected document, and a method of producing a document so that it is not reproduced accurately, are provided which are effective even with the modern resolution copiers, and those utilizing non-xerographic technologies, such as the Canon 500 color copier. The document according to the invention is able to provide a warning word or symbol upon reproduction because it utilizes different screen densities (that is dot/rule thicknesses) so that even if a would be counterfeiter can adjust the settings of the copier, no setting can be found which accurately reproduces the entire protected document, that is without a warning word or symbol being visible by the human naked eye.

According to one aspect of the present invention, a protected document is provided comprising the following elements: A substrate having a surface. At least three discrete halftone printed bands disposed on the surface and provided by geometric elements. Each of the printed bands having a significantly different screen density than proximate bands. Within each band the geometric elements comprising a warning word or symbol, and a background. And, within each band, one of the warning word or symbol and background having geometric elements of a size such that they are readily reproduced by a photocopy machine, while the other of the warning word or symbol and background has geometric elements of a size such that they are not readily reproduced by a photocopy machine.

The variety of individual components of the protected document according to the present invention is enormous. For example, the geometric elements may comprise dots (e.g. circular or non-circular dots), lines, or other elements; and the size of the geometric elements that are readily reproduceable are typically about 24–34 per centimeter, while those that are not readily reproduceable are about 52–64 per centimeter, regardless of density.

The bands on the protected document are typically provided in sequence, for example they can be either linear bands or circular bands. The screen densities of the discrete bands are about 1%–10% different than the screen densities of an adjacent band, depending upon color. The densities of the bands for light inks, such as greens, range from about 1–45%, while the density of bands for very light inks, such as yellows, range from about 1 to 80%, and the densities of dark inks, such as blues, blacks, and some reds, range from about 1–35%. The bands typically cover substantially the entire substrate surface, and it is preferred to use interband areas having densities gradually transitioning between the densities of adjacent bands. Normally the total density variation between discrete bands is about 10–25%, but again that will depend upon ink color and the size of the document. Most of the time all of the geometric elements will be of the same color, however geometric elements of different color may also be utilized.

The warning word or symbol may be any easily recognized word or symbol, such as the word "Void". Normally the geometric elements making up the "Void" are what drop out upon photocopying, although the background may drop out instead. Where a plurality of adjacent bands are provided, normally a uniform progression in density from darker to lighter, or lighter to darker (or both) is provided. The substrate may also include other indicia, such as full tone indicia in the form of monetary or control number indicia, and a camouflage background may also be provided.

The document according to the invention is the only known document which cannot be accurately reproduced (that is with the "Void" or like warning symbol becoming visible to the naked eye) by one utilizing a Canon 500 color copier having access to setting changes.

According to another aspect of the present invention, a method of producing a document on a photocopy machine is provided. The method comprises the following steps: (a) Producing a document from a substrate having a surface by printing at least three discrete halftone bands comprising ink geometric elements on the surface, so that each of the printed bands has a different screen density, and within each band there is printed a halftone indica, and a background, and within each band, one of the halftone indicia and background has geometric elements of a size such that they are reproduced by a photocopy machine, while the other of the halftone indicia and background has geometric elements of a size such that they are not reproduced by a photocopy machine. (b) Printing full tone indicia on the surface which is accurately reproducible by a photocopy machine. And, (c), reproducing the document on a photocopy machine, so that regardless of the setting of the photocopy machine at least one band of halftone indicia or associated background geometric elements do not reproduce accurately as viewed by the naked human eye; while the full tone indicia and the halftone indicia or associated background geometric elements which do reproduce accurately, are accurately reproduced. As indicated above, the document produced utilizing the method as recited above, even if reproduced on a laser copier, such as a Canon 500 color copier, will indicate the warning word or symbol in at least one of the bands thereof since it is impossible to adjust the copier to accurately reproduce all the bands of varying densities.

It is the primary object of the present invention to provide a protected document which will not accurately reproduce on any type of photocopy machine, but rather will indicate a warning. This and other objects of the invention will become clear from an inspection of the detailed description of the invention, and from the appended claims.

BRIEF DESCRIPTION OF THE DRAWINGS

FIG. 1 is a schematic representation of a protected document according to the present invention;

FIG. 3 is a schematic representation of a photocopy of the document of FIG. 1;

DETAILED DESCRIPTION OF THE DRAWINGS

Figure 6:
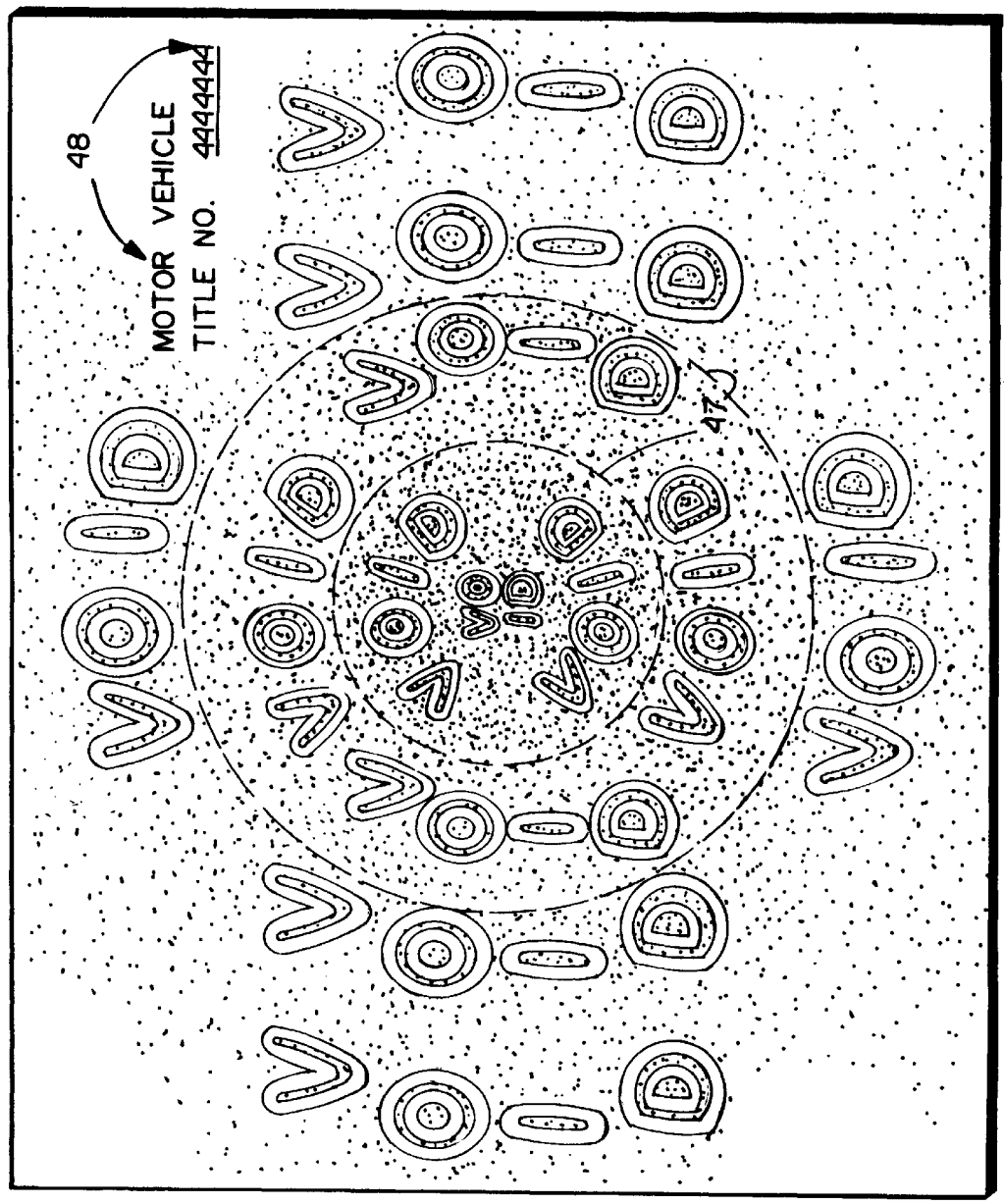
FIG. 6 is a schematic representation of a photocopy of a third configuration of protected document according to the invention.

An exemplary protected document according to the invention is shown generally by reference numeral 10 in FIG. 1. It is to be understood, however, that it is impossible to accurately illustrate by any known process exactly how the original document according to the present invention looks due to the inability to accurately copy the document by conventional processes suitable for making patent drawings. Therefore, an actual sample of the product according to the invention is attached hereto as a part of this specification. the sample illustrating the almost designer effect provided by the graduating screen densities utilized according to the invention.

The protected document 10 comprises a substrate 11, typically of paper, having a surface, or top face, 12. On the surface 12 are at least three discrete halftone printed bands provided by geometric elements. In the actual embodiment illustrated in FIG. 1, there are eleven discrete halftone printed bands, including a center band 14, two end bands 15, 16, and the intermediate bands 17, 18, 19, 20, 21, 22, 23, and 24. The geometric elements are typically dots or lines, such as circular dots, although other geometric elements may also be provided. Conventional dot or line screens may be utilized to produce the printed bands 14 through 24.

Each of the printed bands 14 through 24 has a significantly different halftone screen density than other bands proximate thereto. Where the bands are arranged in sequence, as illustrated in FIG. 1, each band has a significantly different screen density than the adjacent bands on either side thereof. The variation in screen density will depend upon many factors, including the color or colors of the ink utilized to print halftone band geometric elements, how many bands are provided on the document 10, how closely the bands are spaced, etc. Normally, however, the screen densities of the discrete bands are about 1.0%–10% different than the screen densities of an adjacent bank, the densities differing by a lower amount (e.g. about 1.5–3%) where dark colored inks (such as blues, blacks, and some reds) are utilized, and being as much as 7 to 10% if the inks are light color (e.g. most greens) or very light color (e.g. yellows). In the embodiment illustrated in FIG. 1, the central band 14 has a screen density of about 7%, while the end bands 15, 16 have a density of about 18%, the bands 20 and 21 a density of about 10%, the bands 19 and 22 a density of about 12%, the bands 18 and 23 a density of about 14%, and the bands 17 and 24 a density of about 16%. In all, the maximum density variation between all the discrete bands is about 10–35%, depending upon ink color.

As indicated above, the densities utilized will vary significantly depending upon ink color. The specific example given above is for a dark color ink, such as a blue, black, or some reds, and while the density will only change about 10 to 25% per document, the absolute value of the density may vary from about 1–25% for such dark color inks. For light inks, such as greens, the variation may be from about 1–45%, while for very light inks the range may be about 1–80%. The absolute density utilized will depend upon the exact document 10, e.g. check, motor vehicle title, etc.

Although it is not possible to accurately illustrate it in patent drawings, FIG. 1 is intended to indicate density variations which have a uniform progression from darker to lighter, or lighter to darker. In fact in the exact document 10 illustrated in FIG. 1, the central band has the lightest density, there being a uniform progression from the central band 14 out to both the first and second end bands 15, 16. That is why, in the example given above, the bands equidistant from the central band 14 (e.g. bands 17 and 24) have about the same density, and about the same density differences with the bands on either side thereof.

It is also desirable, according to the invention, to provide interband areas having densities gradually transitioning between the densities of the adjacent bands, in order to provide the best visual affect on the final document 10. For example, the interband areas 28 and 29 are provided between the bands 14, 21 and 14, 20, respectively. In the interband areas 28, 29 there is gradual change in density. For example if the central band 14 has a 7% density and the adjacent band 21 has a 10% density, in the interband area 28 the density will vary from about 7% at the left hand margin thereof, uniformly, to about 10% at the right hand margin thereof. The geometric elements of the interband areas 28, 29, etc., are the same as those making up the bands 14 through 24.

Also difficult to illustrate in a patent drawing, but present in FIG. 1, is coverage of substantially the entire surface 12 with the geometric elements forming the bands 14 through 24. Of course there may be areas which do not have the geometric elements printed thereon depending upon the particular type of document, but for most protected documents, such as checks, money orders, motor vehicle titles, and the like, it is desirable to have the bands cover substantially the entire surface 12.

In most circumstances, all of the geometric elements making up the bands 14 through 24 (e.g. dots or lines) are of the same color. However some of them may be of different color, and that will be taken into account in determining the density variations between bands, the absolute densities of the bands, etc.

Another feature of the document 10 according to the invention is the disposition within each band of geometric elements comprising a warning word or symbol, and a background.

Figure 2:
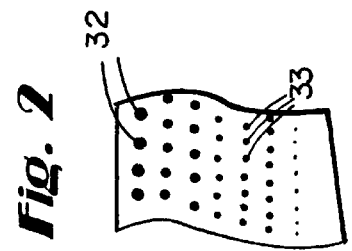
FIG. 2 is a schematic representation of an interface area within a particular halftone printed band of the protected document according to the invention showing geometric elements making up a warning word or symbol, and those making up a background.

FIG. 2 schematically illustrates the differences between the warning word or symbol and a background within a particular halftone printed band (e.g. band 14). In FIG. 2, the larger dots 32 are of a size such that they are readily reproduced by a photocopy machine, whereas the smaller dots 33 are of a size such that they are not readily reproduced by a photocopy machine. The dots 32 will comprise either the warning word or symbol, or background, and similarly for the dots 33. For example the larger dots 32, which reproduce readily, will form the background, whereas the dots 33 form the warning word or symbol (e.g. the word "Void"). Even though the dots 32, 33 provide, as far as the naked eye is concerned, a halftone printed band of uniform density, because of the dot size differences, the frequency of dots is different. Although the size of the geometric elements 32, 33 may vary depending upon the particular photocopy machine, inks, and the like, normally the dots 32 (or corresponding lines) are provided about 24–34 per centimeter, whereas the dots 33 (or corresponding lines) are provided about 52–64 per centimeter.

The document 10 surface 12 can have various forms of indicia printed thereon, and typically will have such indicia printed thereon. For example, full tone indicia 35 may be provided indicating a payee for a check, full tone indicia 36 indicating a monetary amount, for example for a check or money order, and various other indicia (such as bank name, etc.) may be printed in full tone. For this purpose halftone characters which are readily reproduceable by a photocopy machine are equivalent to full tone indicia.

Although not shown in the drawings, if desired a camouflage pattern may also be provided on the surface 12, the provision of a camouflage pattern being generally described in earlier referenced U.S. Pat. Nos. 4,582,346 and 4,265,469.

An exemplary photocopy of the document 10 is shown generally by reference numeral 40 in FIG. 3. It will be seen that the photocopy 40 was produced by a particular photocopy machine, at a particular setting, such that the warning word or symbol, in this case "Void", in the bands 14, 20 and 21 did not become visible to the naked eye. However because of the large number of different densities of the bands 14 through 24, the cancellation word "Void"—clearly illustrated at 42 in bands 15 through 19 and 22 through 24—is clearly visible to the naked eye.

Figure 4:
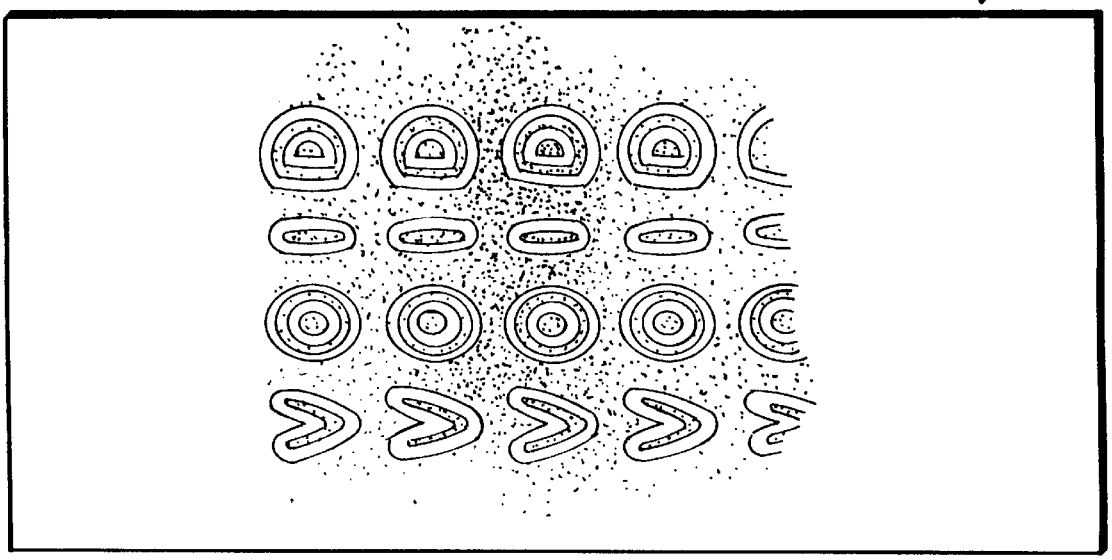
FIGS. 4 and 5 are schematic reproductions of photocopies, utilizing two vastly different settings on the same high resolution photocopy machine, of another configuration of protected document according to the invention.
Figure 5:
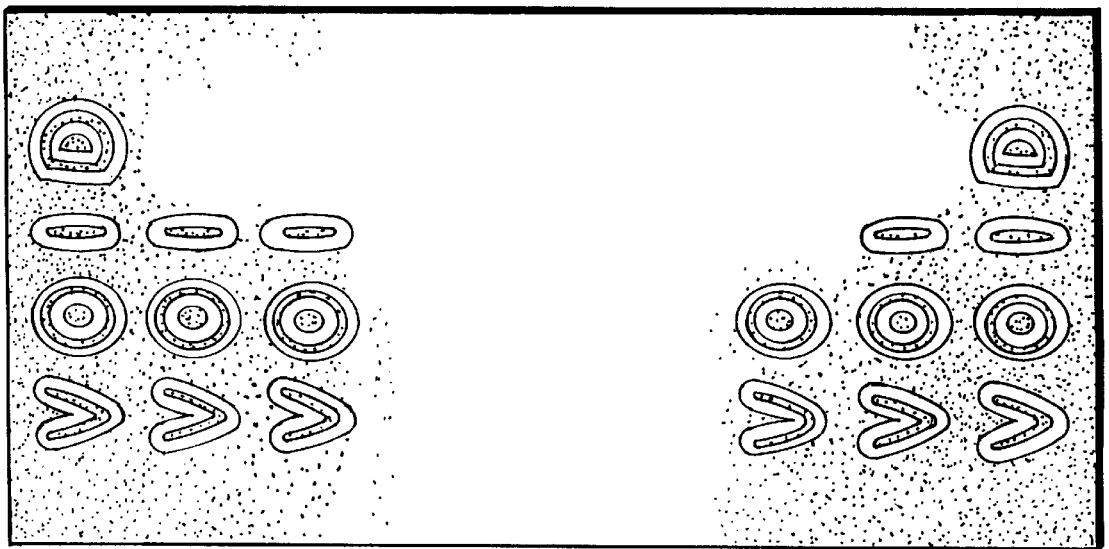

FIGS. 4 and 5 illustrate photocopies 44, 45, respectively of another protected document according to the invention. In this protected document, the bands are arranged horizontally, rather than vertically (as in the FIGS. 1 and 3 embodiment), and nine bands are provided. Photocopy 44 was made at one particular setting of the photocopy machine, while the copy 45 was made at another setting of the machine, indicating that although various of the warning words or symbols in some bands can be made non-recognizable on a copy, there will be at least one band where the warning word or symbol is recognizable.

FIG. 6 shows a photocopy 46 of a slightly different embodiment of the invention. In the embodiment indicated in FIG. 6, the warning word or symbol is disposed in circular bands; that is the different density bands are concentric circles. Two of the concentric circles are illustrated schematically in dotted line by reference numeral 47 in FIG. 6. In this embodiment too, if desired, interband areas having uniformly graduating variations may be provided.

On the photocopy of FIG. 6, the full tone indicia 48, which includes a registration or like number for a motor vehicle title, or for a similar document, has obviously been clearly reproduced on the copy 46.

The document according to the invention will foil counterfeiting on essentially all known present photocopy machines, whether by the xerographic process (e.g. Xerox L-6500 color copier), or laser processes (such as the Canon 500 color copier).

The invention also contemplates a method of producing an inaccurate (to the naked eye) reproduction of a document on a photocopy machine. The method comprises the following steps: (a) Producing a document (10) from a substrate having a surface by printing at least three discrete halftone bands comprising ink geometric elements on the surface, so that each of the printed bands has a different screen density, and within each band there is printed a halftone indica, and a background, and within each band, one of the halftone indicia and background has geometric elements of a size such that they are reproduced by a photocopy machine, while the other of the halftone indicia and background has geometric elements of a size such that they are not reproduced by a photocopy machine. (b) Printing full tone indicia (35, 36) on the surface which is accurately reproducible by a photocopy machine. And, (c), reproducing the document on a photocopy machine, so that regardless of the setting of the photocopy machine at least one band of halftone indicia or associated background geometric elements (32) do not reproduce accurately as viewed by the naked human eye (e.g. bands 15–19 and 22–24 in FIG. 3); while the full tone indicia and the halftone indicia or associated background geometric elements which do reproduce accurately (33), are accurately reproduced. Step (a) is preferably practiced by printing at least some of the geometric elements (e.g. 32, 33) in a color other than black, and step (c) may be practiced by reproducing the document on a laser or a xerographic copier, such as on a Canon 500 color copier.

When the method described above is practiced, a reproduced document (e.g. 40) is produced which is the only known document that will necessarily be clearly to the naked eye inaccurately produced on a Canon 500 color copier, regardless of the setting thereof.

It will thus be seen that according to the present invention, a method has been provided for ensuring inaccurate reproduction of a protected document, as well as a protected document which indicates a warning word or symbol if an attempt is made to counterfeit the document by reproduction on a photocopy machine. While the invention has been herein shown and described in what is presently conceived to be the most practical and preferred embodiment thereof, it will be apparent to those of ordinary skill in the art that many modifications may be made thereof within the scope of the invention of the invention, which scope is to be accorded the broadest interpretation of the appended claims so as to encompass all equivalent structures and methods.

What is claimed is:

1. A protected document comprising:

a substrate having a surface;

at least three discrete halftone printed bands disposed on said surface and provided by geometric elements, and in sequence;

each of said printed bands having a significantly different screen density than proximate bands;

within each band said geometric elements comprising a warning word or symbol, and a background;

within each band, one of said warning word or symbol and background having geometric elements of a size such that they are readily reproduced by a photocopy machine, while the other of said warning word or symbol and background has geometric elements of a size such that they are not readily reproduced by a photocopy machine; and interband areas having densities gradually transitioning between the densities of adjacent bands.

2. A document as recited in claim 1 wherein said bands cover, with said interband area, substantially said entire surface.

3. A document as recited in claim 1 wherein the maximum density variation between all the discrete bands is about 10–35%, depending upon ink color.

4. A document as recited in claim 1 wherein some of the geometric elements are of different color.

5. A protected document comprising:

a substrate having a surface;

at least three discrete halftone substantially circular printed bands disposed on said surface and provided by geometric elements;

each of said printed bands having a significantly different screen density than proximate bands;

within each band said geometric elements comprising a warning word or symbol, and a background; and within each band, one of said warning word or symbol and background having geometric elements of a size such that they are readily reproduced by a photocopy machine, while the other of said warning word or symbol and background has geometric elements of a size such that they are not readily reproduced by a photocopy machine.

6. A document as recited in claim 5 wherein about 52–64 per centimeter geometric elements that are readily reproducible by a photocopy machine are provided, and about 24–34 per centimeter geometric elements that are not readily reproducible by a photocopy machine are provided.

7. A document as recited in claim 6 wherein the bands are in sequence, and wherein the screen densities of the discrete bands are about 1.0%–10% different than the screen densities of an adjacent band.

8. A document as recited in claim 7 wherein the densities of the bands for light inks, such as greens, range from about 1–45%, the densities of the bands for very light inks, such as yellows, range from about 1–80%, and the densities of dark inks, such as blues and blacks, range from about 1–25%.

9. A protected document comprising:

a substrate having a surface;

at least three discrete halftone printed bands disposed on said surface and provided by geometric elements;

each of said printed bands having a significantly different screen density than proximate bands;

within each band said geometric elements comprising a warning word or symbol, and a background;

within each band, one of said warning word or symbol and background having geometric elements of a size such that they are readily reproduced by a photocopy machine, while the other of said warning word or symbol and background has geometric elements of a size such that they are not readily reproduced by a photocopy machine; and wherein some of the geometric elements are of different color.

10. A protected document comprising:

a substrate having a surface;

at least three discrete halftone printed bands disposed on said surface and provided by geometric elements;

each of said printed bands having a significantly different screen density than proximate bands;

within each band said geometric elements comprising a warning word or symbol, and a background;

within each band, one of said warning word or symbol and background having geometric elements of a size such that they are readily reproduced by a photocopy machine, while the other of said warning word or symbol and background has geometric elements of a size such that they are not readily reproduced by a photocopy machine; and wherein a plurality of adjacent bands have a uniform progression in density from darker to lighter, or lighter to darker.

11. A document as recited in claim 10 wherein said at least three bands comprises at least five bands, including a central band and first and second end bands, arranged in sequence, adjacent bands having a uniform progression of from darker to lighter or lighter to darker from said first end band to said central band, and then from lighter to darker, or darker to lighter, respectively, from said central band to said second end band.

12. A document as recited in claim 10 wherein said bands are linear bands which each extend from one end of the substrate surface to an opposite end thereof.

* * * * *